Patented Jan. 15, 1935

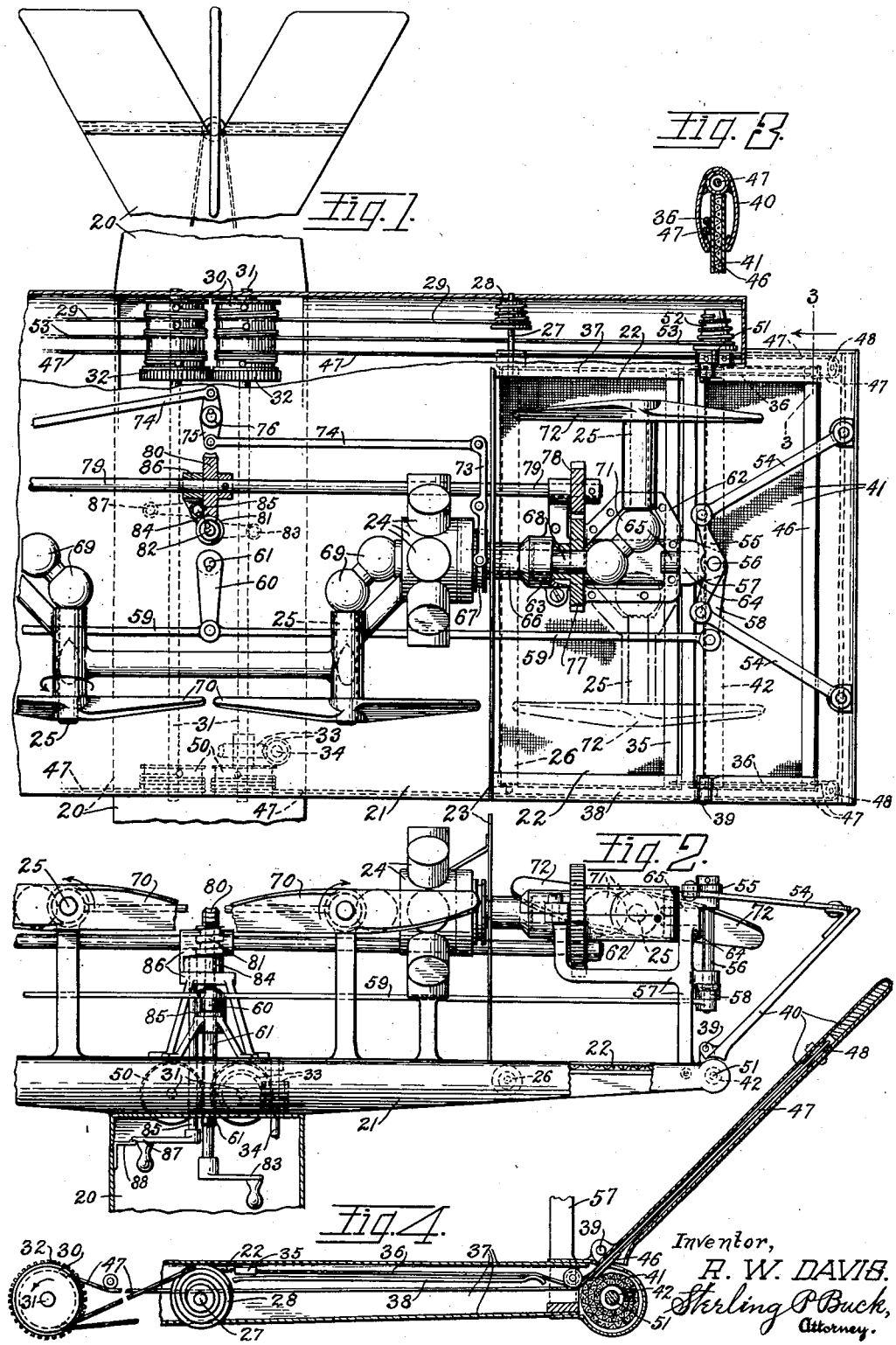

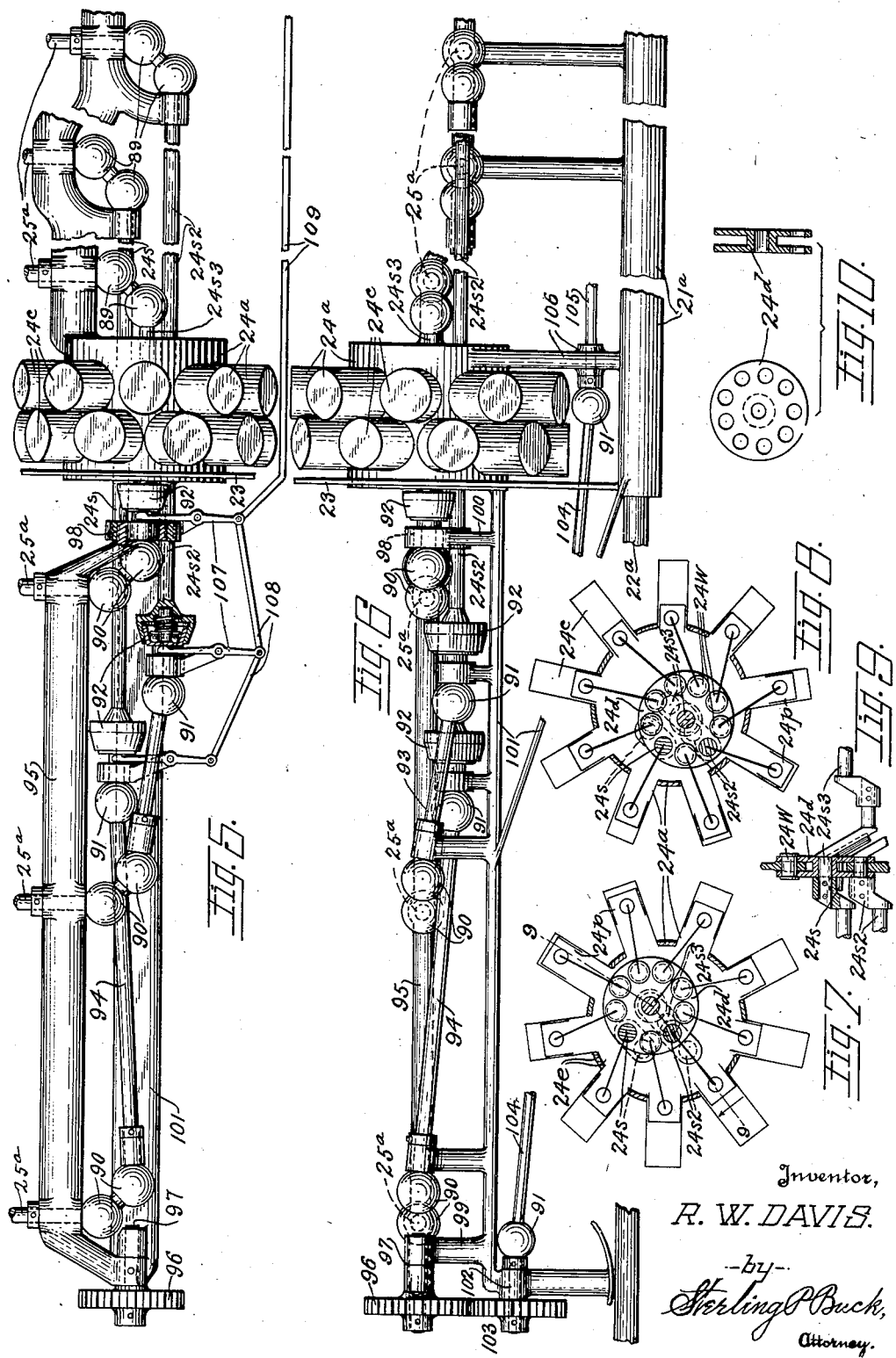

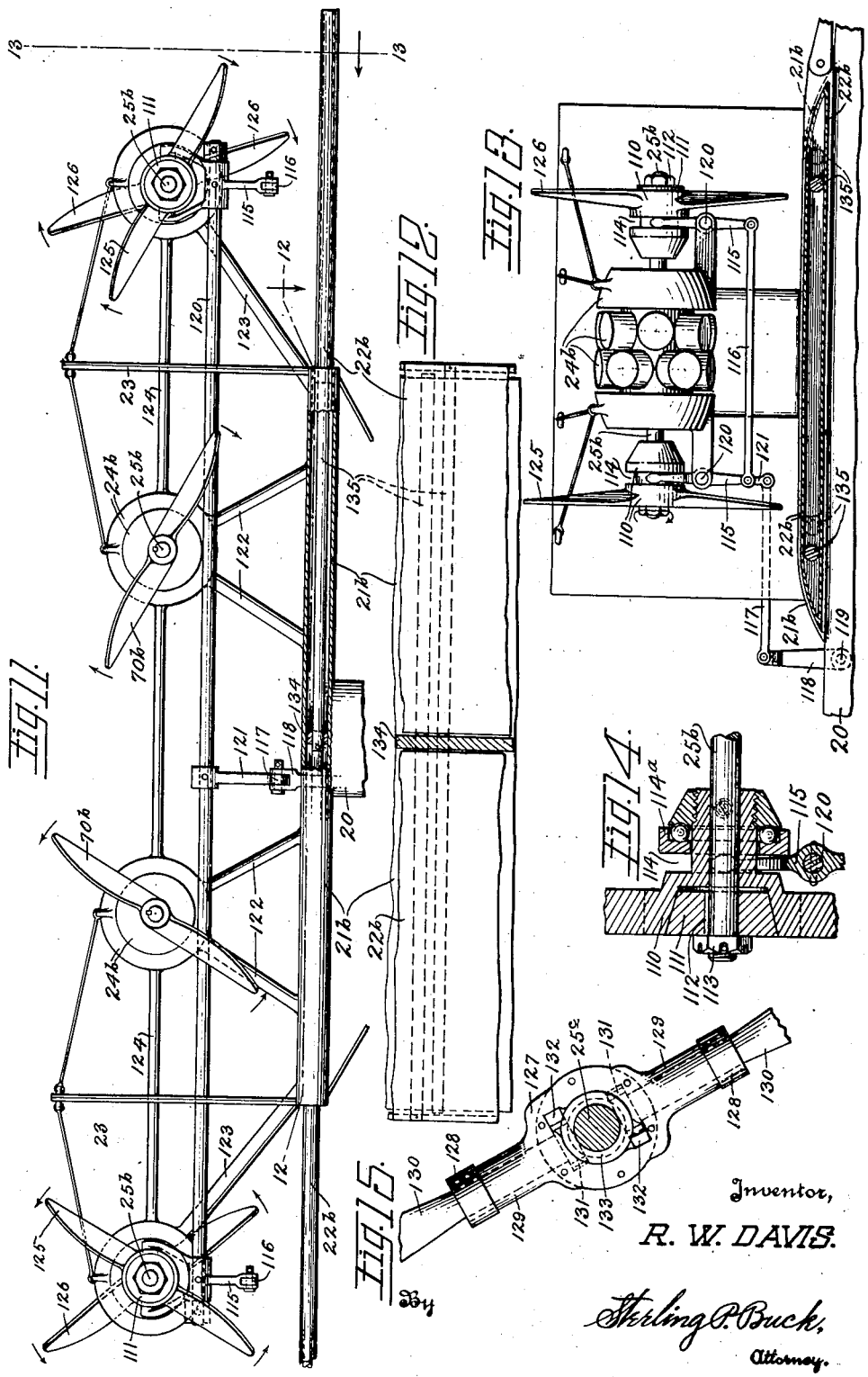

1,987,607

UNITED STATES PATENT OFFICE 1,987,607

HOVERING AIRPLANE MECHANISM

Robert W. Davis, Milwaukee, Wis., assignor of twenty per cent to Sterling P. Buck Application September 19, 1932, Serial No. 633,863
Renewed September 18, 1934

19 Claims. (Cl. 244—14)

This invention relates to aircraft, and especially to devices which enable airplanes to approximate a stand-still in the air, so I choose to call it a hovering airplane mechanism, with reference to each of the present embodiments of the invention.

One object of the invention is to provide an airplane that will sustain itself up in the air while hovering.

Another object is to provide an airplane having a wing or plane that is laterally extensible and retractible in combination with propellers supported over the extensible parts as well as over the fixed main part, so as to create air currents over the extensible wings (when extended) and thereby cause partial vacuums to effect a lifting force on the extended wing sections, hence on the airplane.

Another object is to provide an airplane with rearwardly-pulling propellers in combination with the forwardly-pulling propellers, and with means to render the rearwardly-pulling propellers or power-units effective and ineffective, at will, independently of the forwardly-pulling propellers, so as to effect wide differences in the highest and lowest attainable and sustainable speeds of the airplane.

Another object is to provide the airplane with propellers that are operable to force air-currents forward as well as rearward over the wing or plane; and to provide vanes, walls or thin partitions on the wing to separate the forward and rearward air-currents for preventing eddy currents or other conflict between the forward and rearward air-currents.

Another object is to provide a reversible or invertible propeller mechanism which operates to pull rearwardly when locked in its rearwardly-pulling position, and which is automatically thrown to its forwardly-pulling position instantly upon being unlocked.

Another object is to provide a fixed main wing or plane having thereon or therein extensible and retractible lateral plane-extensions, or wing-extensions, and also having thereon propellers in such positions that they are over the lateral wing-extensions when the latter are extended.

Another object is to provide forward and rearward propellers, with interconnecting clutch-mechanisms that combine to hold the forward propellers clutched to the power-shaft while also holding the rearward propellers de-clutched, and vice versa; so that, whichever propeller is in operation, this operating propeller automatically holds the other propeller out of operation while maintaining itself in the clutched operative relation, until the clutch-mechanism is shifted by the pilot or operator.

Another object is to provide an airplane-driving mechanism that includes a circulating main driving member to which a number of propeller-shafts may be operatively connected for obtaining some of the advantages stated in my Patent No. 1,855,385, in combination with the advantages of my present mechanism for inverting, reversing and transposing certain of the propellers, as specified hereinafter.

Another object is to provide an airplane with substantially horizontal lifting wing-extensions and oblique stabilizing wing-extensions, and with means to simultaneously project these wing extensions, the same means being effective to securely lock these extensions in their respective projected and retracted positions.

Another object is to provide, in connection with the automatically inverting and transposing propeller-mechanism, a simple and effective means to turn the inverted propellers to their rear or speed-retarding positions and to automatically lock them there, in combination with a quick-releasing means by which the forward speed of the airplane is very quickly accelerated in case of impending danger in landing.

Another object is to provide an airplane mechanism by which the forward speed of a rising or landing airplane can very quickly be accelerated or de-celerated for avoiding collision with electric wires and other obstacles, so as to effect a safe landing at either the near side or the far side of the interfering object, or to fly slowly while rising or veering (when near the ground), at will of the pilot or operator; this object being especially important when flying at night or in a fog, snow, etc.

An important object, to be obtained by this hovering airplane mechanism, is the minimizing of weight necessary in the landing gear; that is, by minimizing the landing shock, the factor of safety necessary in the landing gear is minimized; and besides, the danger in landing, is minimized because of the reduced landing-speed.

Another object is to provide an airplane having a central main wing-section having lateral wing-sections thereon, the latter being extensible and retractible, and a number of propellers so arranged that approximately one-half of the aggregate air-engaging area of the propellers is disposed over the central wing-section (which has approximately one-half the total wing-area), and operable to pull forward only; and approximately one-fourth of the aggregate air-engaging surface of the propellers is disposed over each lateral wing-section when the latter is extended; each of these lateral propellers being supported on the main wing-section and operable to produce either a forward pull or a rearward pull, at will of the pilot or operator.

Other objects and important features are pointed out or implied in the following details of description, in connection with the accompanying drawings in which:

Fig. 1 is a top plan view of one form of my invention, parts being broken away to eliminate repetition of the counterpart mechanism shown, and to disclose certain working parts within the wing or plane; the engine and dual universal joints being shown conventionally; one of the invertible propellers being shown in fill lines and in broken lines.

Fig. 2 is a front elevation of the structure shown in Fig. 1, the tips of certain propeller blades and a part of the leading edge of the wing-frame being broken away to disclose the mechanism behind them, the clutch-operating levers and links being eliminated.

Fig. 3 is an enlarged vertical sectional detail, the section being taken along the line 3—3 of Fig. 1.

Fig. 4 is an enlarged vertical sectional view showing a part which is eliminated in the other figures, but constituting the rear right-side (left-side in Fig. 1) plane-extending mechanism which corresponds to that shown at the upper-right corner of Fig. 1.

Fig. 5 is a top plan view of a modified form of the invention parts being in section, and other parts being broken out, this view illustrating one-half, a duplicate, of the multiple propeller-driving mechanism of an airplane.

Fig. 6 is a rear view of the mechanism shown in Fig. 5, with the omission of the clutch-operating mechanism, and addition of parts of the plane or wing on which it is mounted, and the further addition of shifting gear for the propeller-shaft-frame.

Fig. 7 is a diagrammatic view, the section being taken through the left annular series of engine cylinders of Figs. 5 and 6, showing how the engine's pistons are connected to the three driving crank-shafts through the medium of a circulating disc.

Fig. 8 is a diagrammatic view, the section being taken through the right-hand annular series of engine cylinders of Figs. 5 and 6, showing the second piston-actuated circulating disc in engagement with different cranks (of the three driving shafts), from the cranks shown in Fig. 7.

Fig. 9 is a fragmental sectional view along the line 9—9 of Fig. 7.

Fig. 10 is braced view of one of the circulating discs that serve as transmission connectors between the three driving crankshafts and the pitmen that connect to the engine-pistons, in side elevation and in central vertical section.

Fig. 11 is another modified form of the invention, in front elevation parts being broken away, and part of the leading edge of the central plane being in section to show the central guide-beam for the supporting rods of the extensible and retractable planes or wing sections.

Fig. 12 is a fragmental detail view in horizontal section along the line 12—12 of Fig. 11.

Fig. 13 is a front-to-rear vertical section along the line 13—13 of Fig. 11.

Fig. 14 is an enlarged sectional detail view of the friction-clutch mechanisms employed in this form of the invention.

Fig. 15 is a fragmental sectional detail-assembly view of a propeller hub mechanism for reversing the leading and trailing edges of the blades for alternate forward and rearward pull of the propeller, for use as an alternative of the propeller reversing (inverting) and the clutch-shifting mechanisms shown in other figures of the drawings.

Referring to these drawings in detail, wherein similar reference numerals correspond to similar parts in the several views, the invention is described in detail as follows:

In Figs. 1, 2, 11 and 13, a fragment of the fuselage 20 is shown merely to show the relation of the other parts thereto and to one another. The central plane or wing section 21, of Figs. 1, 2 and 4 is fixed on or united with the fuselage by any appropriate means, and the same is true of the section 21a of Fig. 6, and of 21b of Figs. 11, 12 and 13. In each form, the plane or wing is made extensible and contractible by means of horizontally projectable and retractable plane sections as at 22, in Figs. 1, 2 and 4; at 22a, in Fig. 6; and at 22b in Figs. 11, 12 and 13. In each form, the lateral edges of the main or central wing-section carries a thin vertical wall or vane 23 which serves as a wind-current separator or air-current separator for a purpose presently explained. These may be apertured for permitting other parts of the combination to extend therethrough. In each form, there are at least two prime movers which are preferably internal combustion engines, as conventionally shown as 24, in Figs. 1 and 2; at 24a, in Figs. 5, 6, 7 and 8; and at 24b, in Figs. 11 and 13. Each form is also provided with propeller-shafts; as at 25, in Figs. 1 and 2; at 25a, in Figs. 5 and 6; and at 25b, in Figs. 11, 13 and 14. In Fig. 15, the propeller shaft 25c may be different from the others in one or more respects. Having thus shown the combination of main parts that is common to all forms of this invention, the various details will be described as follows:

Referring to Figs. 1, 2, 3 and 4, the extensible lifting sections 22 are each formed of flexible fabric that may be composed of fibrous material, rubber or rubber substitute, and wires or slats that extend forward and rearward and render these sections inflexible in the front and rear directions, but flexible in the lateral or right and left directions so as to be wound on and unwound from rollers 26 on shafts 27 which carry cable-drums 28 on which are wound cables 29. These lines or cables 29 are also, respectively, wound on pulling means which include winding drums 30 which are carried by rotary shafts 31 and geared to one another by gearing 32 so that they rotate in opposite directions. One of the pulling devices may operate the other through the medium of the gearing 32, being itself operated by any appropriate means, as (for instance) a worm gearing 33, rotatable by a shaft 34 that extends into the fuselage 20. By means of these devices, the roller 26 can be turned in the direction for winding the wing extensions 22 for retracting them and reducing the drag when flying at high speed.

However, when landing or preparing to land while flying at slow speed, the wing extensions or sections 22 are to be extended to the position shown in Figs. 1 and 2, from that shown in Fig. 4, and for this purpose, a strengthening and stiffening slat or bar 35 is united with the flexible part of each wing extension 22, and cables 36 are secured to this bar 35 for pulling the extension 22 out to its extended position. The main wing section 21 has channelled lateral extensions 37 and 38, in and between which the respective extensible sections operate, and these extensions have guides 38 on which the front and rear edges of the parts 22—35 travel when being extended or retracted. Inclined stabilizing wing-extensions are pivotally mounted at 39, each of these inclined sections including a frame 40 which is comparatively rigid, but capable of being bent by means presently described. A flexible and extensible stabilizer section 41 has one edge secured to a roller 42, and has its opposite edge provided with a slat or bar 46 (similar to the bar 35 and for a similar purpose) which connects with the bar 35 by means of the cables or links 36, so that when the associated bar 46 is pulled outward, the bar 35 is also pulled outward. Cables 47 are secured to the bar 46, and pass around sheaves or pulleys 48 and 49 (Figs. 1 and 4) and thence around winding drums 50 (on the respective shafts 31) and around the respective drums 30. The direction of winding of the cables 47 is opposite or reverse to that of cables 29, so the rotating of drums 30 and 50 in one direction extends the section 41, thereby extending section 22; and by rotating the same drums in the opposite direction the sections 22 are retracted.

The winding-drum or roller 42 is carried by a rotary shaft 51 which also carries a cable-drum 52 in which a cable or line 53 is wound for rotating the shaft 51 and roller 42 and thus winding up or retracting the stabilizer section 41—46. One end of each cable or line 53 is secured to and wound around one of the drums 30, so the rotation of these drums simultaneously retracts the stabilizer sections 41.

For deflecting or slightly bending the stabilizers, that is, giving them each a slight twist for assistance in guiding the airplane, two links 54 are pivotally connected thereto and to a dual lever 55 which is pivotally mounted, at 56, on a supporting frame 57 which may be termed a bearing-frame, inasmuch as it includes bearings for the pivot or shaft 56 and for parts presently described. An arm 58 is carried by each shaft 56 for imparting rotary or oscillatory movements to the shaft 56 so as to pull and push the respective links 54 and thus distort or deflect the stabilizer frames. The arm 58 is actuated by a link 59 which is pivoted thereto and to an arm 60, to which latter a second arm 59 is pivoted for the similar connection and purpose at the opposite side of the airplane. The arm 60 is secured on an upright shaft 61 that has a crank or other operating means (not shown) in the fuselage.

A propeller-frame 62 is rotatably or reversibly or invertibly supported in the frame 57, one end being journalled in a bearing 63, and the opposite end journalled in a bearing 64. In Fig. 2 it is seen that the frame 62 consists of upper and lower sections that are secured to one another by bolts or screws (not shown) through the bolt-holes seen in Fig. 1. When these frame-sections are secured together, they clamp the pin or pivot 65 between them so it becomes a part of the invertible frame 62, and rotates in the bearing 64. The bearing 63 extends to the engine 24 and has a cylindrical part 66 on which a clutch member 67 is slidable axially for operatively connecting a shaft 68 to the engine, and for disconnecting this shaft from the engine, at will of the operator, while the engine continues to operate and to turn a double universal joint 69 that operates one of the two intermediate propellers 70 through the medium of their respective shafts 25, it being understood that all parts shown at the right side of the fuselage are duplicated on the left side, though such duplication is not illustrated in the drawings. A double universal joint 71 connects each shaft 68 to one of the lateral or invertible propellers 72 through the medium of its shaft 25, so the correlated engine 24 operates the propellers 70 and 72 simultaneously when the clutch member 67 is set for connecting the shaft 68 with the engine 24. For operating the clutches, levers 73 are engaged with the clutch-members 67 and with links 74 which latter are pivotally connected to a double lever 75 on an upright shaft 76 which may be turned by any appropriate means (not shown).

For turning the frames 62 and thereby inverting and transposing the propellers 72 from the full-line position to the broken-line position in Fig. 1, and vice versa, said frame 62 is formed or provided with a gear member 77 which may be a wheel or only a toothed segment and is meshed with a toothed pinion 78 on a shaft 79 which is journalled in the frames 62 and carries a worm wheel or gear member 80 that is meshed with a worm 81 on a shaft 82 that carries an operating handle 83. The shaft 82 is journalled in a bearing 84 which is pivotally mounted on and operable by a shaft 85 that is journalled in a pedestal or bearing frame 86 in which the shaft 79 is also journalled. A crank or handle 87 is secured on the shaft 85, and a spring-detent 88 is provided to normally hold the handle 87 in such position that the worm 81 is thereby held in mesh with the worm-wheel 80; but when the handle 87 is pushed back from the position shown in Figs. 1 and 2, it swings the worm 81 out of engagement with the worm-wheel 80, so the latter is then free to be turned by action of the shaft 79 and its connections with the bearing-frame 62. In this connection, it should be understood that the operation of the engines 24, in turning the shafts 68, continually tends to turn the frames 62 to the broken line position, but they cannot so turn while the worms 81 are in mesh with their respective worm-wheels 80 and while the latter are not turning; so, as soon as the worm-wheel 80 is released from the correlated worm, the torque of the shafts 68 automatically throws the frames 62 and their propellers 72 forward, so that instead of these propellers pulling rearward, they at once begin pulling forward and very rapidly accelerate the forward motion of the airplane to carry it beyond any near obstruction that may have come into view while in the act of landing or preparing to land. On the other hand, when it is desired to slow-down, the propellers (in the broken line position) are first de-clutched and thus rendered inactive; next the gearing 77—78 is operated (by means priorly explained) to turn the propellers 72 to the rear position; and then, to rapidly decelerate the speed, then the clutches are thrown into action, so the propellers 72 begin to pull rearward and offset the action of the forwardly pulling propellers 70; and of course, the friction-clutches can be governed to turn the rearwardly pulling propellers so as not to entirely stop the airplane prematurely. However, if the airplane and its load are well balanced, it may be brought to a very low speed at the moment of landing, for the well known reason that the operation of the propellers, which are directly over the plane or wings, tend to create vacuums immediately over the wings and thereby exert a very considerable lifting tendency which retards the descent of the air-plane when landing.

When the propellers are in the respective positions shown in full lines in Figs. 1 and 2, and are operating, the propellers 70 are driving currents of air rearward, and the propellers 72 are driving currents of air forward, and there would be intermingling of these oppositely moving currents if the vanes or partitions 23 were absent; but their presence avoids any conflict of the forward and rearward currents, and each of such currents contributes a highly efficient lifting tendency for the reason and purpose explained.

Referring now to Figures 5 to 10 inclusive, it should be understood that while only one engine 24a is shown, the same and its correlated parts here shown are duplicated, in practice, so that an air-plane embodying this form of the invention has twelve propeller shafts driven by two engines or power units 24a. However, each power unit may drive a greater or less number of propeller shafts without departure from this general idea or embodiment of invention. In the detailed description of this form, it will be considered as an air-plane mechanism, rather than a complete airplane. While the power unit 24a is of novel construction and specially designed for use with an airplane mechanism of this kind and type, it is useful for other purposes, so it will not be claimed per se in this patent; but will be described for showing its relation to the other parts here shown. This engine is preferably driven by internal combustion and has eighteen cylinders, 24c, arranged in two staggered annular series of nine in each series, having corresponding pistons 24p whose connecting rods are pivoted to two circulating discs 24d by means of seven wristpins for each disc, and two crank-shafts 24s and 24s2, the crank-pins of which are shown in section, and the journals of which are shown by dotted circles in Figs. 7 and 8. Each disc 24d is centrally apertured to provide a bearing for the corresponding crank of a crank-shaft 24s3. In view of the fact that these three crank-shafts pass through the discs 24d, they cannot rotate or change their angular relation to one another or to the engine-body 24e in which they are journalled; so the cranks carry each of the discs in a circulating motion, while the discs hold the cranks in a definite angular relation to one another. Of course the explosions in the cylinders will have to be properly timed for causing the pistons to drive the discs or universal connectors 24d and thereby to drive the crank-shafts.

While the double universal joints in this form may be the same as those in the other forms, they must be referred to per se, respectively, so those at the right side of the engine are designated 89, while those at the left side are designated 90, and the single universal joints are designated 91. The central shaft (crank-shaft) 24s3 has both ends connected to propeller shafts through the medium of double universal joints 89 and 90, and in addition to these intermediaries, a friction clutch 92 connects the left end of the shaft 24s3 with the adjacent universal joint 90. The shaft 24s2 is likewise connected to other propeller-shafts 25a, through transmission members 90 and 92, and in addition, a length of shafting 93 and a single universal joint 91 are included. The shaft 24s has connections similar to those of shaft 24s2, except that a longer shaft-section 94 is used, instead of a short section as at 93. In breaking out parts at the right side, the question may arise as to clutches and single universal joints; but it should be understood that none are employed or needed on the right side; and the necessity of those on the left side will now be explained as follows:

Only the propeller-shafts that are over the extensible and retractable plane-sections 22a are to be clutched and de-clutched and to be transposed from front to rear and vice versa. For transposing and inverting the propeller shafts (and their propellers not here shown), they are journalled in a bearing-beam 95 which is united with a gear member 96 and pivotally mounted at 97 and 98, on uprights or pedestals that form parts of a frame or supporting extension 101 that may be directly united with the engine and the main or intermediate plane-section 21a. This frame-extension 101 also includes bearings for the crank-shafts and the shaft-sections 93 and 94; and it also includes a bearing 102 for the axle or journal of a gear member 103 which is connected to a shaft 104 by a single universal joint 91; and this shaft is also connected to a shaft 105 by a universal joint 91; the shaft 105 being journalled in a supporting upright 106 and extending thence to a point over the fuselage (not here shown) where it may be rotated by any appropriate means and constitute an actuating member. By turning the gear member 103, by the means just described, the members 96 and 95 are thereby turned 180° from the forward position (shown) to the rearward position. With respect to the set or rake of the blades of the respective propellers, the same conditions apply as in Figs. 1 and 2, that is, the propellers that are invertible can be caused to pull forward with the stationary propellers or to pull rearward against the stationary propellers. Moreover, the invertible propellers can be rendered effective and ineffective alternately and at the will of the pilot, by means of the friction clutches 92 which may be operated by any appropriate means, for instance, by shifting levers 107 connected by links 108, and operable in unison by an actuating link 109 that may extend into the fuselage or to a handle that extends into the fuselage. However, it is within the scope of this invention to make the clutches separately and independently operable.

Referring now to Figs. 11 to 14, inclusive, wherein the engines are designated 24b, the rotary crank-shafts 25b are extended to constitute the propeller-shafts, respectively, each of these engine-shafts 25b extending in opposite directions from the engine-body and carrying the respective propellers thereon, two on each engine-shaft, but not fixed thereon. In other words, either of the two propellers of an engine-shaft may be free or loose on the shaft while the other one of the two is secured thereto, to be rotated thereby, and for obtaining this relation and result, I employ two clutches on each engine-shaft, each of these clutches preferably including the propeller-hub 110 and a conical frictional member 111 that is united with the shaft by appropriate means, for instance, a key 112 and a nut 113. An annular channel 114 is formed in the periphery of each hub 110, and shifting levers 115 engage with the walls of these grooves for operating the clutches. In order that they may be operated simultaneously, and that the operating movement of either will hold the other out of operation, the shifting levers are pivotally connected to one another by a link 116. To either of these levers 115 or to the link 116, an actuating means of any appropriate kind may be connected, for instance, a link 117 may have one end connected to a link 115 and its other end connected to a lever or arm 118 that is pivotally mounted at 119, on or in the fuselage 20. The description in this paragraph applies particularly to Fig. 13 which shows only one of the two propelling units that are over the extensible wing sections 22b. In Fig. 11, two of such units are shown at the right and left ends, the arcuate arrows showing that both propellers of each unit rotate in the same direction when each is clutched to the engine-shaft, at the same time showing that the propellers of each unit have their blades inclined or having such rake that the front propeller of each unit pulls forward when clutched, but the rear propeller of the same unit pulls rearward when clutched; so the shifting of the clutches of each unit changes the function from forward-pulling to rearward pulling, and vice versa. Of course this shifting and consequent function should take place simultaneously in both of these propelling-and-retarding units at the same instant; so, to effect this result, the clutch-levers may be mounted on one or two rock-shafts 120. If two are used, as shown in Fig. 13, only one link 116 need be used; or, if two links 116 are used, as shown in Fig. 11, only one rock-shaft 120 need be used; or all may be used, at will of the manufacturer.

In practice, instead of connecting the link 117 to one of the levers 115, it is preferably connected to an arm 121 which is secured to the intermediate part of the front rock-shaft 120, at a point over the fuselage. In this form of the invention, there are four engines mounted on the stationary or main plane section 21b, their supports consisting of uprights 122 and 123 in combination with struts 124. The two intermediate engines have each only one propeller which is indicated at 70a, and these may be termed "Constant propellers", inasmuch as they are constant as to operation whenever their respective engines operate, and in contradistinction to the propellers of the outer or lateral engines which may be termed "Variant" because the front and rear propellers are alternately in and out of operation, and because their respective speeds may be varied by manipulating the clutches in a manner similar to that of regulating the speed of a wire-drum-hoist. At this juncture, it should be understood how the operation of one propeller, when in operation, holds the other propeller of its pair out of operation: Assume that a front propeller 125 is rotating in the direction of the curved arrow in Fig. 13, thereby pulling forward; it is evident that this pulling action not only holds it in engagement with its clutch-member 111, but also holds the clutch-levers and their connections in the position for pulling and holding the rear propeller of its shaft out of engagement with its clutch-member 111. Likewise, and for the same reason, the rear propellers, when in operation hold the front propellers out of operation. Therefore, no lock or detent is needed for the clutch-actuating lever 118.

While the hubs 110 may be of one-piece construction, they are preferably constructed as shown in Fig. 14 wherein one wall of the groove 114 is free to rotate on ball-bearings, as indicated at 114a; but when a one-piece hub is employed, it is within the scope of this invention to provide pivoted rollers on the clutch-lever ends that work in the grooves 114.

Instead of the propellers being invertible, as in Figs. 1, 2, 5 and 6; or clutched and de-clutched as in Figs. 11, 13 and 14; the propeller blades may be reversible, that is, rotatable in the hub so as to change them from forward-pulling to rearward-pulling and vice versa. Such rotary movement of the blades is preferably accomplished by an actuating mechanism similar to that shown for the clutches in Figs. 11 and 13. Therefore, I refer to Fig. 15 wherein a hollow two-piece hub 127 has its substantially counterpart halves united by two sleeves 128 around the blade bearings 129. This hub is secured to or united with the engine-shaft 25c. The blades 130 are each provided with a toothed pinion 131 that engage, respectively, with racks 132 which are secured to or united with a peripherally grooved collar 133 that is axially movable along the shaft 25c by means similar to the clutch-levers 115 of Figs. 11 and 13.

The center or median plane of the main wing-section 21b is provided with an apertured beam 134 which serves as part of the beams to hold the upper and lower sheets of this section spaced enough to permit the adjustable wing-sections 22b to slide within the main wing-section. The beam 134 also serves as a bearing member for the longitudinally slidable rods 135 which are inward extensions of the adjustable wing-sections. By referring to Fig. 12, it will be seen how the rods 135 are slid through the bearing member 134, into parallel relation to one another when the adjustable wing-sections are retracted. They may be retracted (as in Fig. 12) and extended (as in Fig. 11) by means such as shown in Figs. 1, 2 and 4, or by any other appropriate means.

Although I have described these forms of my invention specifically, I do not intend to limit my invention to these exact details of construction and arrangement, for the invention is susceptible of numerous changes within the scope of the inventive ideas as implied and claimed; and, moreover, it is within the scope of this invention to use any form of wing-extension with any form of propelling and retarding means over the extended wing sections.

What I claim as my invention is:

1. An airplane structure including a fuselage, a main wing-section secured to the fuselage, a forwardly propelling means on the main wing-section, two wing-sections carried by the lateral edges of said main wing section and movably secured thereto so as to be extensible and retractible, means united with the main wing-section, and extending to positions outward from and above the said lateral edges for creating forward air currents over the extensible and retractible wing sections when the latter are extended, and means for controlling the second said means so as to control the air-currents thereof.

2. The combination defined by claim 1, the third said means being provided with a manually operable device by which it may be controlled at will of a pilot or operator.

3. The combination defined by claim 1, and walls secured between the first said means and the second said means so as to prevent conflict or interference of rearwardly moving air from the first said means and forwardly moving air from the second said means.

4. The combination defined by claim 1, and means to adjust the second said means so as to change the direction of its air-currents from forward to rearward and vice versa.

5. The structure defined by claim 1, and means to render the second said means alternately effective and ineffective at will of a pilot or operator.

6. The combination defined by claim 1, means to render the second said means effective and ineffective, and means to adjust said second means so as to change the direction of the air-current produced thereby.

7. The combination defined by claim 1, means to render the third said means effective and ineffective, and means between the first said means and the second said means to prevent conflict of a rearwardly moving air-current over the main wing-section and forwardly moving air-currents over the extended wing-sections.

8. An airplane structure including a fuselage having a plane or wing united therewith, means mounted on the top of the wing or plane for creating a rearward air-current over the wing or plane to propel the airplane forward and exert a lifting tendency, means mounted on the top of said wing or plane for creating a forward air-current over the top of the wing or plane concomitant with the rearward air-current and thereby to retard the speed of the airplane and increase the said lifting tendency by suction against the top of the airplane, and means to control said second means independently of the first said means.

9. The combination defined by claim 8, the third said means being provided with a manually operable device by which it may be controlled at will of a pilot or operator.

10. The combination defined by claim 8, and walls secured between the first said means and the second said means so as to prevent conflict or interference of the oppositely moving air-currents.

11. The combination defined by claim 8, and means to adjust the second said means so as to change the direction of its air-current from forward to rearward and vice versa.

12. The combination defined by claim 8, and means to render the second said means alternately effective and ineffective at will of a pilot or operator.

13. The combination defined by claim 8, means to render the second said means effective and ineffective, and means to adjust the second said means so as to change the direction of air-current produced thereby.

14. The combination defined by claim 8, means to render the third said means alternately effective and ineffective, and means between the first said means and the second said means to prevent conflict of the oppositely moving air-currents produced by the first and second said means.

15. An aircraft controlling mechanism which includes a frame that is pivotally mounted and provided with a journal-bearing which has its axis at an angle to the pivotal axis about which the frame is turnable, a rotary air-current producer having an axle journalled in said bearing, a rotary driving member having its axis at an angle to the axle of said air-current producer, transmission means operatively connecting said rotary driving member to said axle of the air-current producer, actuating means to turn said frame on its axis, and controlling means to render said actuating means ineffective and thereby to release said frame, whereby, when the said frame is released, the torque of said driving member and said transmission means cooperate with said axle for turning said frame about its axis and thereby causing the air-current producer to change the direction of the air-current produced thereby.

16. The combination defined by claim 15, said controlling means being operable to render said actuating means effective for turning said frame in a direction counter to the torque of said rotary driving member.

17. An aircraft controlling mechanism which includes a wing or plane, a frame fixed on said wing or plane, a rotary air-current producer having an axle journalled in said frame and being operable to drive an air-current in a predetermined direction, a rotary driving member operatively connected to said axle for turning said air-current producer, a second frame which is pivotally mounted on the first-said frame co-axially with said driving shaft, a second rotary air-current producer which has an axle journalled in the pivotally mounted frame and operatively connected to said driving member and normally substantially parallel to the axle of the first said air-current producer so it forces its air-current in said predetermined direction of the first said air-current producer, said pivotally mounted frame being turnable on its axis for changing the direction of the air-current of the said second air-current producer.

18. The combination defined by claim 17, and means between the first said air-current producer and second said air-current producer for preventing conflict of the air-currents produced thereby.

19. In an airplane structure, the combination of a fuselage, a wing-section united with the fuselage, two thin and flexible guiding extensions pivotally mounted on the respective lateral edges of said wing section and being inclined upwardly and outwardly from the wing section, an extensible and flexible wing section movable outward and inward in each guiding extension while supported and guided by the latter, and means mounted on the first said wing-section and connected to the guiding extensions in the proper operative relation for flexing the latter while turning them on their pivotal mounts for rendering the flexing relatively easy.

ROBERT W. DAVIS.